D. C. KUFFEL.
SPRING WHEEL.
APPLICATION FILED AUG. 5, 1920.
1,434,291.
Patented Oct. 31, 1922.
FIG. 1.
FIG. 2.
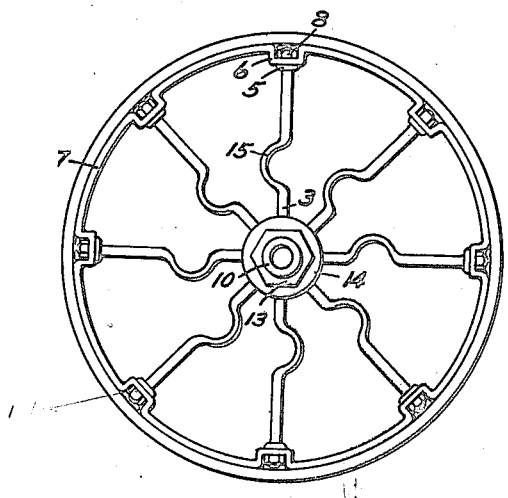
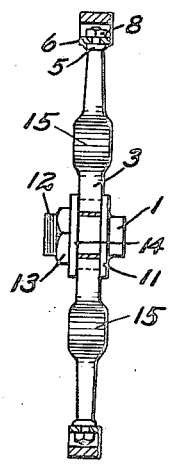
FIG. 3.
FIG. 4.
FIG. 5.
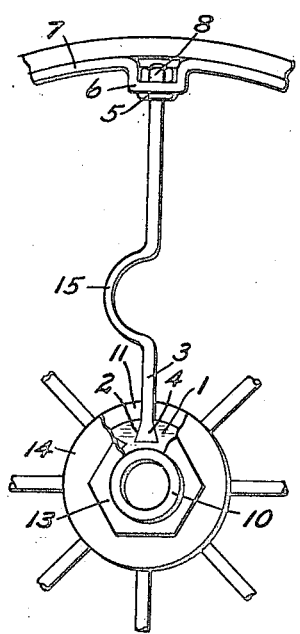
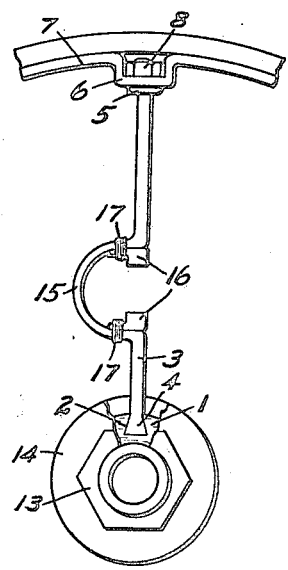
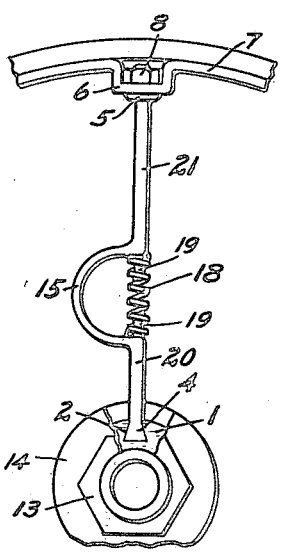
INVENTOR
DAVID C. KUFFEL
BY
Hazard & Miller
ATTORNEYS.

Patented Oct. 31, 1922.

1,434,291

UNITED STATES PATENT OFFICE.

DAVID C. KUFFEL, OF LITTLE BEAR LAKE, CALIFORNIA, ASSIGNOR OF ONE-HALF TO A. A. NIXON, OF RANDSBURG, CALIFORNIA.

SPRING WHEEL.

Application filed August 5, 1920. Serial No. 401,494.

*To all whom it may concern:*

Be it known that I, DAVID C. KUFFEL, a citizen of the United States, residing at Little Bear Lake, in the county of San Bernardino and State of California, have invented new and useful Improvements in Spring Wheels, of which the following is a specification.

This invention relates to spring wheels and has for its object the provision of a construction including spokes having resilient portions intermediate of their ends.

The invention will be readily understood from the following description of the accompanying drawings, in which Figure 1 is a side elevation of a spring wheel constructed in accordance with my invention.

Fig. 2 is a transverse section through the same.

Fig. 3 is an enlarged side elevation showing one of the spokes and the mounting for the same, and Figs. 4 and 5 are similar views showing a modified form of the invention.

The wheel is shown as comprising a hub sleeve 1 in the periphery of which is arranged a plurality of transverse slots 2 adapted to receive the ends of the respective spokes. The spokes are shown at 3 as provided with tapering heads 4 adapted to be slid into the respective slots 2 which are provided with undercut sides cooperating with the tapered heads of the spokes. The outer ends of the spokes are preferably threaded and provided with enlargements 5, the threaded ends being received through brackets 6 projecting inwardly from the wheel rim 7, the enlargements 5 abutting against one side of said brackets and nuts 8 being threaded on to the threaded ends at the opposite sides of the brackets for positively securing the spokes relative to the wheel rim. The inner ends of the spokes are preferably retained in position by means of a bushing 10 received through the hub cylinder and having a flange 11 at one end thereof arranged to abut against one end of the hub cylinder at the sides of the spokes. The opposite end of the bushing 10 projects beyond the hub cylinder and comprises a threaded bolt 12 of reduced diameter. A flange nut 13 is received upon said bolt with the flange 14 thereof abutting against the ends of the spokes.

The spokes throughout the major portion of their lengths are of non-resilient material and are provided with portions intermediate of their ends of resilient material. The resilient portions of the spokes are shown as flat strips 15 bowed laterally from alinement with said spokes in order to form leaf springs. The springs 15 are preferably bowed laterally a distance substantially equal to the space formed between the ends of said bowed springs, in order that the springs thus formed will exert an appreciable spring tension against compression of the springs longitudinally of the spokes. If found desirable cushioning means may be employed in connection with the springs 15, said cushioning means being arranged to cushion the movement of the end portions of the springs 15 toward one another when the wheel passes over an obstruction. The cushioning means employed may take the form of resilient blocks 16, preferably of rubber, and secured opposite one another to the respective ends of the springs 15 as by suitable connecting means 17. This arrangement of the cushioning means is illustrated in Fig. 4.

In Fig. 5 a form of cushioning means is shown comprising a coil spring 18 extending between the respective ends of spring 15 by means of lugs 19 projecting from the respective ends of spring 15 in longitudinal alinement with the non-resilient portions 20 and 21 of the spokes.

Various changes may be made in the construction as thus described without departing from the spirit of the invention as claimed.

What is claimed is:

1. In a spring wheel, a hub, a rim, and a plurality of radially arranged spokes disposed between said hub and rim, each of said spokes being formed from a single piece of material having an intermediate portion formed into a bow, the cross sectional dimensions of which are substantially wider and thinner than the inner and outer portions of the spoke, that portion of the spoke beyond the bow gradually decreasing in width toward its outer end and the inner portion of said spoke having practically the same width throughout its length.

2. In a spring wheel, a hub, a rim, and a plurality of radially arranged spokes disposed between said hub and rim, each of said spokes being formed from a single piece of material having an intermediate portion formed into a bow, the cross sectional dimensions of which are substantially wider and thinner than the inner and outer portions of the spoke, that portion of the spoke beyond the bow gradually decreasing in width toward its outer end, said outer end terminating in a threaded stud, the inner portion of said spoke having the same width throughout its length and terminating at its inner end in a dovetailed head.

In testimony whereof I have signed my name to this specification.

DAVID C. KUFFEL.